United States Patent
Tatsukawa et al.

(10) Patent No.: US 10,780,916 B2
(45) Date of Patent: Sep. 22, 2020

(54) LANE DEPARTURE SUPPRESSION DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Junpei Tatsukawa, Kariya (JP); Hidenobu Kinugasa, Nagoya (JP); Yuji Okuda, Okazaki (JP)

(73) Assignees: DENSO CORPORATION, Kariya, Aichi-Pref (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 346 days.

(21) Appl. No.: 15/738,527

(22) PCT Filed: Jun. 17, 2016

(86) PCT No.: PCT/JP2016/068030
§ 371 (c)(1),
(2) Date: Dec. 20, 2017

(87) PCT Pub. No.: WO2016/208497
PCT Pub. Date: Dec. 29, 2016

(65) Prior Publication Data
US 2018/0170424 A1    Jun. 21, 2018

(30) Foreign Application Priority Data
Jun. 26, 2015  (JP) .................................. 2015-129175

(51) Int. Cl.
*B62D 6/10*    (2006.01)
*B62D 6/00*    (2006.01)
(Continued)

(52) U.S. Cl.
CPC ............. *B62D 6/10* (2013.01); *B62D 5/0463* (2013.01); *B62D 6/00* (2013.01); *B62D 6/02* (2013.01)

(58) Field of Classification Search
CPC combination set(s) only.
See application file for complete search history.

(56) References Cited

U.S. PATENT DOCUMENTS

2005/0107939 A1* 5/2005 Sadano ............... B60T 8/17557
701/70
2007/0233386 A1* 10/2007 Saito .................... B62D 15/025
701/300

(Continued)

FOREIGN PATENT DOCUMENTS

JP          8-286759 A      11/1996
JP          2006-182127     7/2006
(Continued)

*Primary Examiner* — Rami Khatib
(74) *Attorney, Agent, or Firm* — Maschoff Brennan

(57) ABSTRACT

A lane departure suppression device is provided in a car equipped with a steering angle change mechanism that changes a steering angle and with a motor that operates the steering angle change mechanism, and the lane departure suppression device includes: a main control unit that outputs a main control signal after a position of the car reaches a deflection starting position at which deflection of the car is started in order to suppress departure of the car from a lane, the main control signal representing a main control amount for causing the motor to generate an assist torque that changes the steering angle; and a pre-control unit that outputs, until the main control unit outputs the main control signal, a pre-control signal while the position of the car is located closer to a center of the lane than the deflection starting position is, the pre-control signal representing a pre-control amount for causing the motor to generate an
(Continued)

assist torque equal to or less than a friction torque of the steering angle change mechanism.

5 Claims, 4 Drawing Sheets

(51) Int. Cl.
   *B62D 5/04* (2006.01)
   *B62D 6/02* (2006.01)

(56) References Cited

U.S. PATENT DOCUMENTS

| | | | |
|---|---|---|---|
| 2008/0047775 A1* | 2/2008 | Yamazaki | B62D 15/025 180/443 |
| 2008/0243337 A1* | 10/2008 | Tsuda | B60T 8/17557 701/41 |
| 2009/0245582 A1* | 10/2009 | Sakamoto | G06K 9/00798 382/104 |
| 2010/0030426 A1* | 2/2010 | Okita | B60T 7/22 701/41 |
| 2014/0222295 A1* | 8/2014 | Dornhege | B62D 6/002 701/42 |
| 2014/0379166 A1* | 12/2014 | Kaneko | G08G 1/167 701/1 |
| 2016/0107645 A1 | 4/2016 | Okuda et al. | |
| 2017/0113604 A1* | 4/2017 | Asaoka | B60Q 1/34 |

FOREIGN PATENT DOCUMENTS

| | | |
|---|---|---|
| JP | 2007-331714 A | 12/2007 |
| JP | 2009-227125 A | 10/2009 |
| JP | 2014-118025 A | 6/2014 |
| JP | 2015-003566 A | 1/2015 |

\* cited by examiner

LANE DEPARTURE SUPPRESSION DEVICE

CROSS-REFERENCE TO RELATED APPLICATION

This application is the U.S. national phase of International Application No. PCT/JP2016/068030 filed Jun. 17, 2016 which designated the U.S. and claims priority to JP Patent Application No. 2015-129175 filed Jun. 26, 2015, the entire contents of which are hereby incorporated by reference.

TECHNICAL FIELD

The present invention relates to a lane departure suppression device, and in particular to a device that suppresses a car from departing from its lane by operating a steering angle change mechanism.

BACKGROUND ART

Various devices are known for suppressing a car from departing from its lane by operating a steering angle change mechanism, i.e., a mechanical mechanism that changes the steering angle. For example, PTL 1 discloses that an assist torque for orienting a car toward a lane center position is generated by a motor that operates a steering angle change mechanism. PTL 1 also discloses that if the position of the car is in a dead zone set in a predetermined area around the lane center position, the magnitude of the assist torque is set such that the assist torque cannot be perceived by a driver. After the assist torque of such a magnitude is generated by the motor, the car gradually moves toward the lane center position.

The device disclosed in PTL 1 is configured to keep the car located in the center of the lane. Furthermore, lane departure suppression devices such as a device described in PTL 2 are known for operating a steering angle change mechanism in the event that a car is likely to depart from its lane in order to suppress the car from departing from the lane.

CITATION LIST

Patent Literature

[PTL 1] JP 2014-118025 A
[PTL 2] JP 2015-3566 A

SUMMARY OF THE INVENTION

Technical Problem

If the assist torque is generated in a situation where the car is not so close to the boundary of the lane, a driver may experience discomfort. The lane departure suppression device thus generates the assist torque after the car comes close to the boundary of the lane.

Since the lane departure suppression device generates the assist torque after the car comes close to the boundary of the lane, it is often the case that only a short time is left before the car departs from the lane. Therefore, the assist torque needs to be raised immediately. If the timing of generating the assist torque to cause the deflection of the car is too late, the car ends up departing from the lane.

The steering angle change mechanism does not start to operate until a torque exceeding the friction torque of the steering angle change mechanism is applied. In order to operate the steering angle change mechanism, therefore, the assist torque needs to be generated at a relatively early point in consideration of the friction torque. However, as described above, a driver experiences discomfort if the timing of starting the movement of the car with the assist torque is too early.

The present invention has been made in consideration of these circumstances, and an object thereof is to provide a lane departure suppression device capable of suppressing a driver's experience of discomfort from being given and suppressing a car from departing from its lane.

The above object is achieved by a combination of the characteristics described in the independent claim, and the subordinate claims specify further advantageous examples of the invention.

The first disclosure for achieving the above object is a lane departure suppression device provided in a car equipped with a steering angle change mechanism that changes a steering angle and with a motor that operates the steering angle change mechanism, and the lane departure suppression device includes: a main control unit that outputs a main control signal after a position of the car reaches a deflection starting position at which deflection of the car is started in order to suppress departure of the car from a lane, the main control signal representing a main control amount for causing the motor to generate an assist torque that changes the steering angle; and a pre-control unit that outputs, until the main control unit outputs the main control signal, a pre-control signal while the position of the car is located closer to a center of the lane than the deflection starting position is, the pre-control signal representing a pre-control amount for causing the motor to continuously generate the assist torque equal to or less than a friction torque of the steering angle change mechanism.

The second disclosure for achieving the above object is a lane departure suppression device provided in a car equipped with a steering angle change mechanism that changes a steering angle and with a motor that operates the steering angle change mechanism, the lane departure suppression device including: a main control unit that outputs a main control signal after a position of the car reaches a deflection starting position at which deflection of the car is started in order to suppress departure of the car from a lane, the main control signal representing a main control amount for causing the motor to generate an assist torque that changes the steering angle; and a pre-control unit that outputs, until the main control unit outputs the main control signal, a pre-control signal while the position of the car is located closer to a center of the lane than the deflection starting position is, the pre-control signal representing a pre-control amount for causing the motor to generate the assist torque equal to or less than a friction torque of the steering angle change mechanism, and outputs, at the deflection starting position, the pre-control signal representing the pre-control amount for making the assist torque equal to the friction torque of the steering angle change mechanism.

The pre-control unit is configured to: calculate a pre-control time that is a period of time during which the pre-control signal is output using a lateral velocity of the car and a pre-control distance set in advance as a distance in a lane width direction in which the pre-control signal are output and output, during the pre-control time, the pre-control signal representing the pre-control amount that increases the assist torque at a constant gradient determined using the pre-control time and the assist torque that is generated by the motor at the deflection starting position.

In the present invention, the pre-control unit is provided. While the position of the car is located closer to the center of the lane than the deflection starting position is, the pre-control unit outputs the pre-control signal representing the pre-control amounts until the main control unit outputs the main control signal. Consequently, the assist torques corresponding to the pre-control amounts have already been generated by the time the main control unit starts to output the main control signal. Therefore, the car starts to deflect immediately when the main control signal is output, whereby the car from departing from the lane can be suppressed.

Since the pre-control amount is a control amount for causing the motor to generate the assist torque equal to or less than the friction torque of the steering angle change mechanism, the car does not start to deflect merely through the output of the pre-control signal. Thus, a driver's experience of discomfort can be suppressed despite the output of the pre-control signal.

DESCRIPTION OF EMBODIMENT

Figure 1:
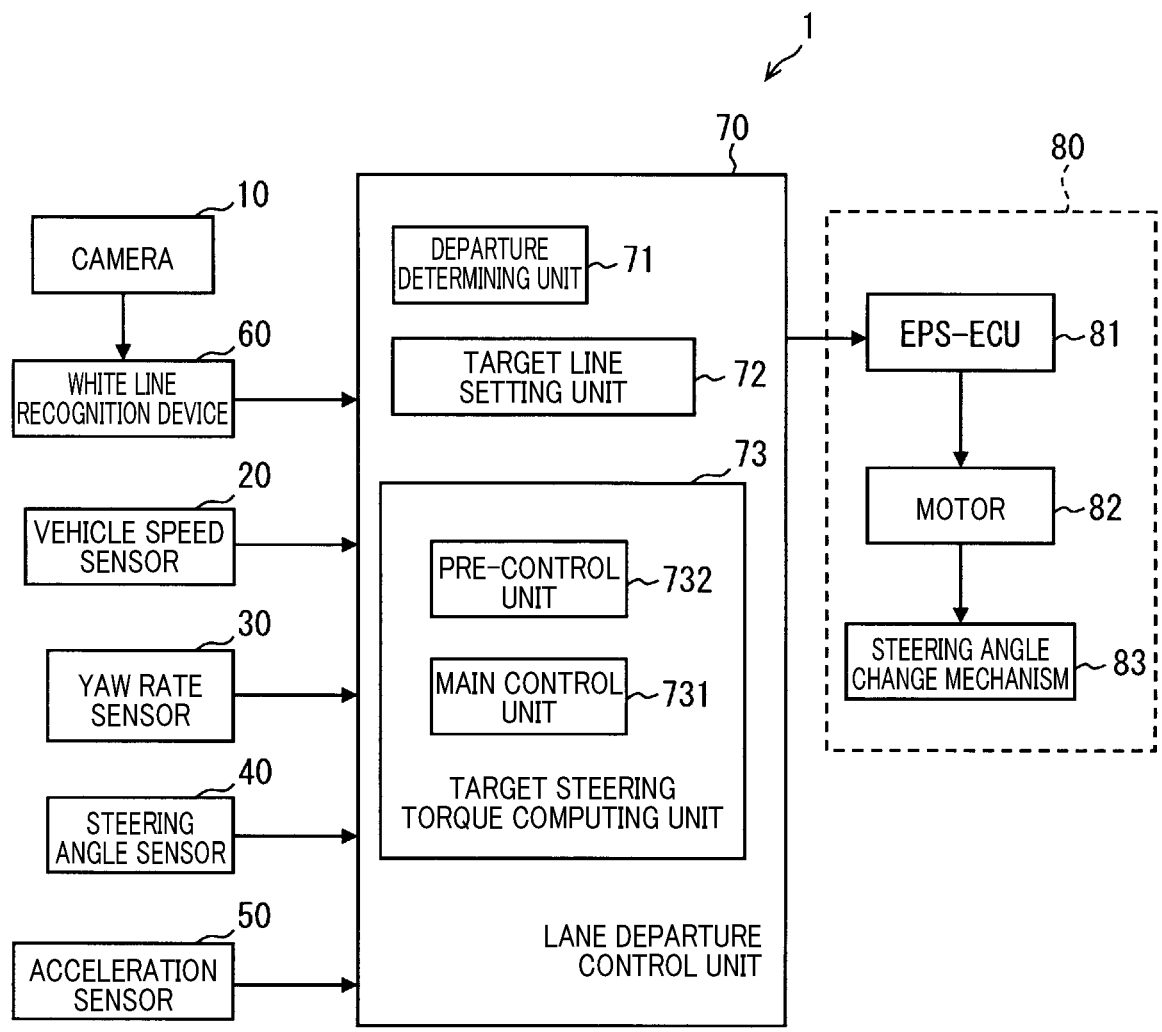
FIG. 1 is a block diagram illustrating a configuration of a lane departure suppression system according to an embodiment.

Hereinafter, an embodiment of the present invention will be described on the basis of the drawings. A lane departure suppression system 1 illustrated in FIG. 1 includes a camera 10, a vehicle speed sensor 20, a yaw rate sensor 30, a steering angle sensor 40, an acceleration sensor 50, a white line recognition device 60, and a lane departure control unit 70 as illustrated in FIG. 1. The lane departure control unit 70 is hereinafter simply referred to as a control unit 70. The control unit 70 is a lane departure suppression device according to the present invention. The lane departure suppression system 1 is installed in a car C illustrated in FIG. 2 together with an electric power steering system 80.

The camera 10 is fixed at a certain position on the car C so as to capture an area around the front of the car. The area to be captured by the camera 10 is an area in which a lane marking that defines a travel lane for the car C can be captured. The camera 10 may be a monocular or compound-eye camera. The camera 10 periodically captures the area at a predetermined frame rate, and outputs image data representing the captured images to the white line recognition device 60.

The vehicle speed sensor 20 detects the vehicle speed of the car C. The vehicle speed sensor 20 then outputs the detected vehicle speed to the control unit 70.

The yaw rate sensor 30 detects the yaw rate, i.e., the rotation angular speed of the car C around the vertical axis passing through the yaw rate sensor 30. The yaw rate sensor 30 then outputs the detected yaw rate to the control unit 70.

The steering angle sensor 40 is a sensor that detects the steering angle of the car, and outputs the detected steering angle to the control unit 70.

The acceleration sensor 50 is a triaxial acceleration sensor whose orientation is fixed such that the z-axis is parallel to the up-down direction of the car, the x-axis is parallel to the front-back direction of the car, and the y-axis is parallel to the width direction of the car. Note that an acceleration sensor that detects the biaxial acceleration in the x- and y-axes may be used instead of the triaxial acceleration sensor. Alternatively, an acceleration sensor that detects the acceleration only in the y-axis may be used. The acceleration sensor 50 transmits the detection value of the acceleration in each axis to the control unit 70.

The white line recognition device 60 recognizes a lane marking from each piece of image data. The lane marking means a road surface marking that defines a travel lane. The lane marking is a linear marking formed by applying, linearly along a road, paint that is discriminable from the road surface such as white, for example. In a case where light-emitting objects such as cat's eyes and lamps are arranged along a road to define a travel lane instead of the paint, these are also referred to as lane markings.

The control unit 70 is a computer including a CPU, a ROM, a RAM, and the like. The CPU executes programs stored in non-transitory tangible storage media such as the ROM while utilizing the temporary storage function of the RAM. Consequently, the control unit 70 functions as a departure determining unit 71, a target line setting unit 72, and a target steering torque computing unit 73. Note that part or all of the functions that are executed by the control unit 70 may be configured as hardware using one or more ICs or the like.

Before the departure determining unit 71, the target line setting unit 72, and the target steering torque computing unit 73 are described, the electric power steering system 80 will be described.

The electric power steering system 80 includes an EPS-ECU 81, a motor 82, and a steering angle change mechanism 83. The EPS-ECU 81 is an ECU that controls the steering angle of the car C by controlling the motor 82, i.e., a steering actuator that rotates a steering shaft. Assist torque and pre-torque command values are input from the control unit 70 to the EPS-ECU 81. In response to each of these torque command values being input, the EPS-ECU 81 controls the current flowing through the motor 82 such that the motor 82 generates the assist torque represented by the torque command value.

The motor 82 is configured to generate an assist torque to supplement a driver's steering force. The motor 82 is connected to a certain rotary shaft of the steering angle change mechanism 83.

The steering angle change mechanism 83 is a mechanical mechanism that changes the steering angle. The steering angle change mechanism 83 has a known configuration including a rack shaft, a steering shaft, a rack gear, a pinion gear, a decelerator, and the like.

Next, the departure determining unit 71, the target line setting unit 72, and the target steering torque computing unit 73 will be described.

The departure determining unit 71 determines whether the car C is likely to depart from the current travel lane. For example, if a lateral distance d from the car C to the lane marking is shorter than a preset threshold distance THd, and the front of the car C is oriented in a direction toward the lane marking, the car C is determined to be likely to depart from the lane.

In this determination, the lateral position of the car C for use in calculating the lateral distance d from the car C to the lane marking is, for example, the position of the end of the front wheel axle close to the lane marking. The distance in the lane width direction from this position to the car-side boundary of the lane marking is regarded as the lateral distance d.

Whether the front of the car C is oriented in a direction toward the lane marking is determined using the extending direction of the lane marking recognized by the white line recognition device 60. Since the extending direction of the lane marking recognized by the white line recognition device 60 corresponds to the extending direction of the lane marking with respect to the orientation of the car C, whether the front of the car C is oriented in a direction toward the lane marking can be determined using the extending direction of the lane marking recognized by the white line recognition device 60.

Alternatively, the departure determining unit 71 may calculate a departure prediction time that is left before the position of the car C coincides with that of the lane marking, and may determine that the car C is likely to depart from the lane if the departure prediction time is equal to or less than a threshold time THt.

The departure prediction time is calculated by dividing the lateral distance d from the car C to the lane marking by a lateral velocity Vy of the car C. The lateral velocity Vy of the car C is calculated using temporal changes in the lateral distance d mentioned above. Alternatively, the lateral velocity Vy of the car C may be calculated by integrating the detection value in the y-axis acquired from the acceleration sensor 50, that is, lateral acceleration.

If the departure determining unit 71 determines that the car C is likely to depart from the current travel lane, the target line setting unit 72 sets a target line for the car C for suppressing the lane departure.

The target line can be set using any of various known methods. For example, the target line can be set using the method described in PTL 2. PTL 2 discloses that the curvature calculated by adding a predetermined value to the curvature of the lane marking is regarded as a first target line for suppressing the departure. In addition, the curvature less than the first target line is set as a second target line that is a target line for aligning the traveling direction of the car C with a direction along the lane after the departure is suppressed.

Figure 2:
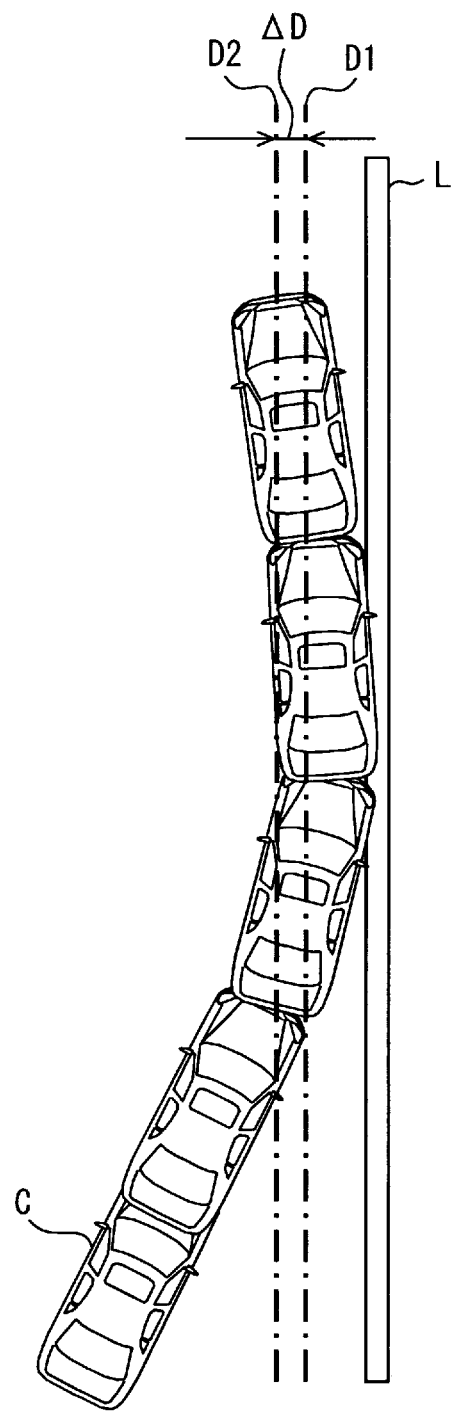
FIG. 2 is a diagram illustrating an exemplary track of a car for the case that a main control unit of FIG. 1 executes control.

The starting point of the target line is a position at which the car C starts to deflect, that is, a deflection starting position D1. The deflection starting position D1 is illustrated in FIG. 2 together with a white line L. The deflection starting position D1 is defined by the distance in the lane width direction from the white line L, namely, the lane marking. The deflection starting position D1 is set such that the distance in the lane width direction increases as the lateral velocity Vy increases.

The target steering torque computing unit 73 computes a torque command value for causing the motor 82 to generate an assist torque for aligning the car C with the target line set by the target line setting unit 72. The target steering torque computing unit 73 includes a main control unit 731 and a pre-control unit 732.

The main control unit 731 determines a target steering angle such that the car C travels along the target line set by the target line setting unit 72. The target steering angle is determined using the actual steering angle detected by the steering angle sensor 40 and the yaw rate detected by the yaw rate sensor 30 in addition to the target line. Then, the assist torque is determined such that the actual steering angle becomes equal to the target steering angle, and an assist torque command value that commands the motor 82 to generate the assist torque is output to the EPS-ECU 81. The assist torque command value corresponds to a main control signal according to the present invention, and the assist torque represented by the assist torque command value corresponds to a main control amount according to the present invention. The main control unit 731 starts the control at the time that the car C reaches the deflection starting position D1. The control that is executed by the main control unit 731 is referred to as main control.

Any of various known processing methods can be used for the process in which the main control unit 731 determines the assist torque on the basis of the target line. For example, the target steering angle may be determined using the deflection between the target line and the current lateral distance d from the car C. The target steering angle may be determined in further consideration of the vehicle speed and lateral velocity Vy of the car C. The assist torque for achieving the target steering angle is determined on the basis of a steering angle difference, i.e., the difference between the target steering angle and the actual steering angle determined using the detection value provided by the steering angle sensor 40.

The pre-control unit 732 outputs pre-torque command values to the EPS-ECU 81 while the position of the car C is located between a pre-torque control starting position D2 and the deflection starting position D1. The control that is executed by the pre-control unit 732 is referred to as pre-control.

The pre-torque command values are output until the main control unit 731 outputs the assist torque command value, that is, until the car C reaches the deflection starting position D1. The pre-torque command value is a signal that commands the motor 82 to generate a pre-torque before the main control unit 731 commands the motor 82 to generate the assist torque that causes the deflection of the car C by outputting the assist torque command value. The pre-torque command value corresponds to a pre-control signal according to the present invention, and the pre-torque corresponds to a pre-control amount according to the present invention. The pre-torque is equal to or less than the friction torque of the steering angle change mechanism 83. Therefore, the car C does not deflect merely through the generation of pre-torques by the motor 82.

Figure 3:
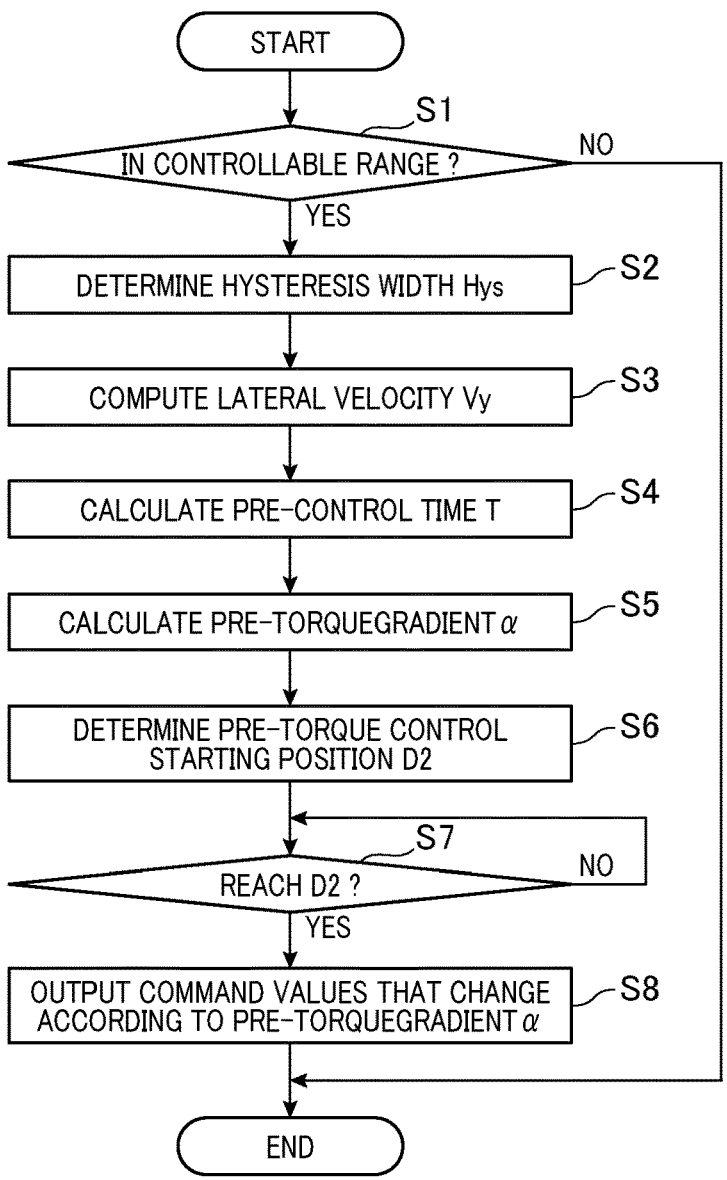
FIG. 3 is a flowchart for explaining a process that is executed by a pre-control unit of FIG. 1.

The process that is executed by the pre-control unit 732 is illustrated in detail in FIG. 3. The pre-control unit 732 executes the process illustrated in FIG. 3 in the event that the departure determining unit 71 determines that the car C is likely to depart from the current travel line.

In step S1, it is determined whether the car C is in a controllable range. The controllable range is a range in which the lane departure suppression control of the main control unit 731 is enabled. Conditions for enabling the control of the main control unit 731 are set in advance. For example, the control of the main control unit 731 is enabled under the condition that the vehicle speed is equal to or greater than a predetermined vehicle speed, the electric power steering system 80 is functioning normally, no canceling torque is input from a driver, and the like.

If the determination in step S1 is NO, the process of FIG. 3 is finished. In contrast, if the determination in step S1 is YES, the process advances to step S2.

Figure 4:
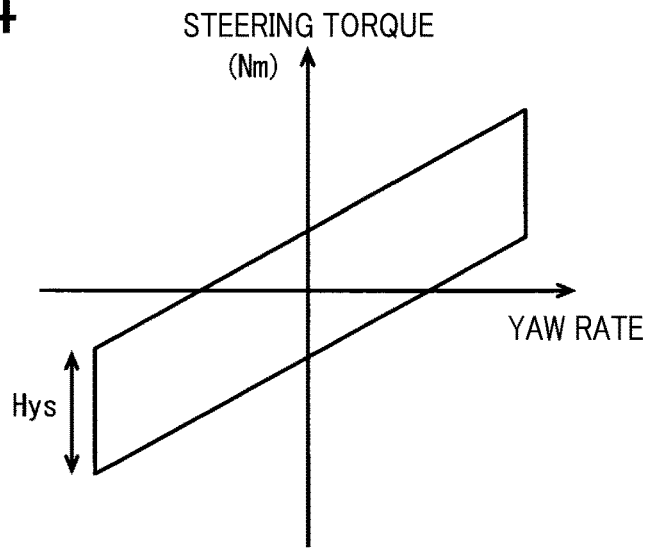
FIG. 4 is a diagram for explaining a hysteresis width that is determined in a step of FIG. 3.

In step S2, a hysteresis width Hys at the current vehicle speed is determined. The hysteresis width Hys will be described with reference to FIG. 4 in which an example of the hysteresis width Hys is illustrated. FIG. 4 indicates that the steering torque increases as the yaw rate increases and that the hysteresis width Hys is involved in the relation between the yaw rate and the steering torque. The hysteresis width Hys results from the friction torque of the steering angle change mechanism 83. In other words, the hysteresis width Hys represents the friction torque of the steering angle change mechanism 83.

The hysteresis width Hys increases as the vehicle speed decreases. In this regard, the lane departure suppression system 1 stores in advance, in a certain storage unit, the relation indicating that the hysteresis width Hys is determined using the vehicle speed and that the hysteresis width Hys increases as the vehicle speed decreases. In step S2, the hysteresis width Hys is determined using the relation stored in the storage unit and the current vehicle speed.

In step S3, the current lateral velocity Vy of the car C is computed. The lateral velocity Vy is calculated, for example, using temporal changes in the lateral distance d. Alternatively, the lateral velocity Vy of the car C may be calculated by integrating the detection value in the y-axis acquired from the acceleration sensor 50.

In step S4, a pre-control time T is calculated. The pre-control time T is a period of time during which pre-torques are generated. The pre-control time T is calculated using a pre-control distance ΔD in which pre-torques are generated and the lateral velocity Vy. In the present embodiment, the pre-control distance ΔD is determined in advance. The pre-control distance ΔD is, for example, several dozen centimeters. Note that the lateral end of the pre-control distance ΔD close to the edge of the lane is the deflection starting position D1 as illustrated in FIG. 2.

Since the pre-control distance ΔD is set in advance, the pre-control time T is calculated in step S4 by dividing the pre-control distance ΔD by the lateral velocity Vy calculated in step S3.

Figure 5:
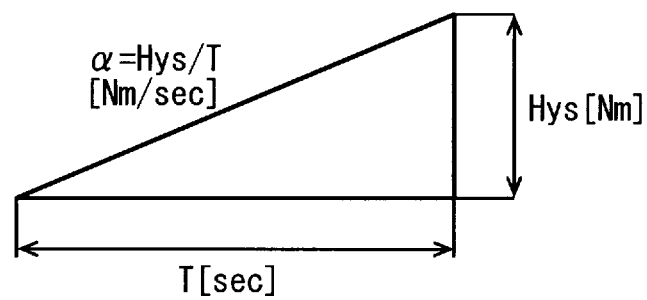
FIG. 5 is a diagram for explaining a pre-torque gradient that is calculated in a step of FIG. 3.

In step S5, a pre-torque gradient α is calculated. As illustrated in FIG. 5, the pre-torque gradient α is calculated by dividing the hysteresis width Hys determined in step S2 by the pre-control time T calculated in step S4.

In step S6, the pre-torque control starting position D2 illustrated in FIG. 2 is determined. The pre-torque control starting position D2 is closer to the inside of the lane by the pre-control distance ΔD than the deflection starting position D1 set by the target line setting unit 72.

In step S7, it is determined whether the lateral position of the car C has reached the pre-torque control starting position D2. If this determination is NO, the determination in step S7 is repeated. In contrast, if the determination in step S7 is YES, the process advances to step S8.

In step S8, pre-torque command values are output such that the pre-torque changes according to the pre-torque gradient α calculated in step S5. The pre-torque command values are continuously output until the lateral position of the car C reaches the deflection starting position D1.

Effects of Embodiment

Figure 6:
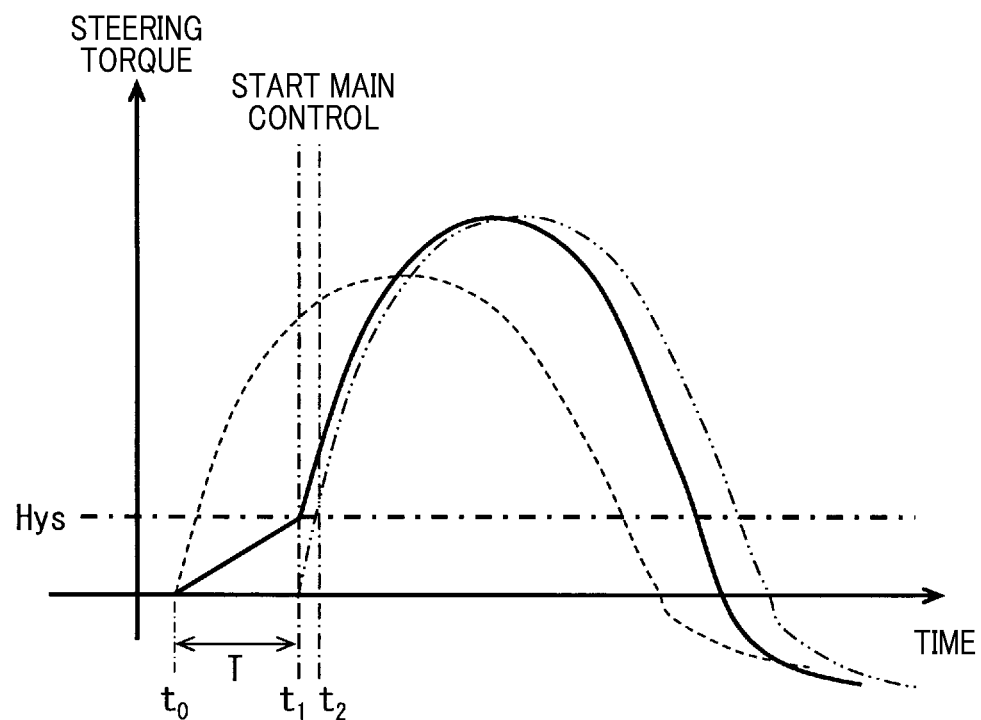
FIG. 6 is a diagram for explaining the effects of the embodiment.

The control unit 70 according to the present embodiment includes the pre-control unit 732. The pre-control unit 732 starts the generation of pre-torques at the pre-torque control starting position D2 that is closer to the center of the lane by the pre-control distance ΔD than the deflection starting position D1 at which the main control unit 731 starts the main control. In the example of FIG. 6, the generation of pre-torques is started at time to.

The pre-control unit 732 outputs the pre-torque command values until the main control unit 731 starts the main control. Consequently, the assist torques corresponding to the pre-torque command values have already been generated by the time the main control unit 731 starts to output the assist torque command value.

Suppose no assist torque is generated by the motor 82 until the lateral position of the car C reaches the deflection starting position D1, and the assist torque command value is output after the lateral position of the car C reaches the deflection starting position D1. Further, suppose the lateral position of the car C reaches the deflection starting position D1 at time $t_1$ in FIG. 6.

Assuming that no assist torque is generated until the lateral position of the car C reaches the deflection starting position D1, even though the assist torque command value is output at time $t_1$, the steering angle actually starts to change at time $t_2$ which is later than time $t_1$ as illustrated by a two-dot chain line in FIG. 6. This is because it takes some time until the steering torque exceeds the hysteresis width Hys, and the steering angle does not start to change until the steering torque exceeds the hysteresis width Hys. Since the steering angle starts to change at time $t_2$ which is later than time $t_1$, the car C is liable to depart from the lane.

In contrast, in the present embodiment, the assist torques corresponding to the pre-torque command values have already been generated by the time the main control unit 731 outputs the assist torque command value. Therefore, the car C starts to deflect immediately after the main control unit 731 outputs the assist torque command value, whereby the departure of the car C from the lane can be suppressed.

As illustrated by a broken line in FIG. 6, suppose the main control unit 731 starts the main control at time $t_0$ when the output of pre-torque command values is started in the present embodiment. In this assumption, the steering torque has already exceeded the hysteresis width Hys by time $t_1$, that is, by the time the car C reaches the deflection starting position D1. Therefore, the car C starts to deflect before the car C reaches the deflection starting position D1. In this case, a driver experiences discomfort since the timing of starting the movement of the car C is too early.

In contrast, in the present embodiment, the pre-torque command values that are output between time $t_0$ and time $t_1$, that is, before the car C reaches the deflection starting position D1, are command values that cause the motor 82 to generate the assist torques equal to or less than the friction torque of the steering angle change mechanism 83. Therefore, the car C does not start to deflect merely through the output of pre-torque command values. Thus, a driver's experience of discomfort can be suppressed despite the output of pre-torque command values.

In the present embodiment, the occurrence of steering vibrations can also be suppressed during the pre-control time T. The reason therefor is as follows. As long as some torque is applied to the steering, even the steering torque equal to or less than the hysteresis width Hys can cause steering vibrations if the rate of change of steering torque, or the gradient, changes. In the present embodiment, however, the pre-torque is increased at a constant gradient, namely, the pre-torque gradient α. Therefore, the occurrence of steering vibrations can be suppressed during the pre-control time T.

In the present embodiment, the pre-torque command values are output such that the assist torque that is generated by the motor 82 when the lateral position of the car C reaches the deflection starting position D1 is equal to the hysteresis width Hys, namely, the friction torque of the steering angle change mechanism 83.

Consequently, the steering angle changes at once when the main control unit 731 starts to output the assist torque command value. The departure of the car C from the lane can thus be suppressed to a great extent in this case, as compared with a case where the steering torque is not zero but still less than the hysteresis width Hys when the main control unit 731 starts to output the assist torque command value.

Since the pre-torque command values are output such that the assist torque becomes equal to the hysteresis width Hys when the lateral position of the car C reaches the deflection starting position D1, the rate of change of steering torque changes little around the time when the lateral position of the car C reaches the deflection starting position D1. Therefore, steering vibration can also be suppressed at the time of switching from the pre-control to the main control.

In the present embodiment, the hysteresis width Hys is determined using the preset relation indicating that the hysteresis width Hys increases as the vehicle speed decreases (S2). Then, the pre-torque command values are output such that the output of the hysteresis width Hys is commanded at the deflection starting position D1 (S8). Consequently, the pre-torque equivalent to the friction torque can be output at the deflection starting position D1 with a high degree of accuracy regardless of changes in the vehicle speed. Therefore, the car C starts to deflect immediately regardless of changes in the vehicle speed.

The embodiment of the present invention has been described above. The present invention is not limited to the above-mentioned embodiment, and the following modifications are also included in the technical scope of the present invention. Furthermore, the present invention can be variously changed for implementation without departing from the gist of the invention.

First Modification

For example, the processing order illustrated in FIG. 3 may be changed. Specifically, step S7 may be executed prior to steps S2 to S6. In the event that the lateral position of the car C reaches the pre-torque control starting position D2, steps S2 to S6 may be executed for the determination of the pre-torque gradient α.

Second Modification

In the above-mentioned embodiment, the main control unit 731 determines the target steering angle, and further determines the assist torque using the target steering angle to output the assist torque command value representing the assist torque to the EPS-ECU 81. Alternatively, the target steering angle and a command value representing the target steering angle may be output to the EPS-ECU 81 as the main control amount and the main control signal, respectively. In this case, the process of determining the assist torque using the target steering angle is performed by the EPS-ECU 81.

Third Modification

In the above-mentioned embodiment, the pre-torque command values are output such that the pre-torque equal to the hysteresis width Hys is generated when the position of the car C reaches the deflection starting position D1. However, even if the pre-torque equal to or less than the hysteresis width Hys is generated when the position of the car C reaches the deflection starting position D1, the car C can deflect at an early point after the position of the car C reaches the deflection starting position D1 in a case where the generated pre-torque is greater than zero, as compared with a case where no assist torque is generated until the position of the car C reaches the deflection starting position D1.

Fourth Modification

The pre-torque command values may be output such that the pre-torque becomes equal to the hysteresis width Hys before the position of the car C reaches the deflection starting position D1.

REFERENCE SIGNS LIST

1: Lane departure suppression system
10: Camera
20: Vehicle speed sensor
30: Yaw rate sensor
40: Steering angle sensor
50: Acceleration sensor
60: White line recognition device
70: Lane departure control unit
71: Departure determining unit
72: Target line setting unit
73: Target steering torque computing unit
80: Electric power steering system
81: EPS-ECU
82: Motor
83: Steering angle change mechanism
731: Main control unit
732: Pre-control unit

The invention claimed is:

1. A lane departure suppression device provided in a car equipped with a steering angle change mechanism that changes a steering angle and with a motor that operates the steering angle change mechanism, the lane departure suppression device comprising:
   a main control unit that outputs a main control signal after a position of the car reaches a deflection starting position at which deflection of the car is started in order to suppress departure of the car from a lane, the main control signal representing a main control amount for causing the motor to generate an assist torque that changes the steering angle; and
   a pre-control unit that outputs, until the main control unit outputs the main control signal, a pre-control signal while the position of the car is located closer to a center of the lane than the deflection starting position is, the pre-control signal representing a pre-control amount for causing the motor to continuously generate the assist torque equal to or less than a friction torque of the steering angle change mechanism, wherein
   the pre-control unit outputs, at the deflection starting position, the pre-control signal representing the pre-control amount for making the assist torque equal to the friction torque of the steering angle change mechanism, and wherein
   the pre-control unit is configured to:
      calculate a pre-control time that is a period of time during which the pre-control signal is output using a lateral velocity of the car and a pre-control distance set in advance as a distance in a lane width direction in which the pre-control signal are output; and
      output, during the pre-control time, the pre-control signal representing the pre-control amount that increases the assist torque at a constant gradient determined using the pre-control time and the assist torque that is generated by the motor at the deflection starting position.

2. The lane departure suppression device according to claim 1, wherein
the pre-control unit acquires a vehicle speed of the car, and determines the pre-control amount that is represented by the pre-control signal that is output at the deflection starting position on the basis of the vehicle speed acquired and a preset relation indicating that the friction torque increases as the vehicle speed decreases.

3. A lane departure suppression device provided in a car equipped with a steering angle change mechanism that changes a steering angle and with a motor that operates the steering angle change mechanism, the lane departure suppression device comprising:
a main control unit that outputs a main control signal after a position of the car reaches a deflection starting position at which deflection of the car is started in order to suppress departure of the car from a lane, the main control signal representing a main control amount for causing the motor to generate an assist torque that changes the steering angle; and
a pre-control unit that outputs, until the main control unit outputs the main control signal, a pre-control signal while the position of the car is located closer to a center of the lane than the deflection starting position is, the pre-control signal representing a pre-control amount for causing the motor to continuously generate the assist torque equal to or less than a friction torque of the steering angle change mechanism, wherein
the pre-control unit outputs, at the deflection starting position, the pre-control signal representing the pre-control amount for making the assist torque equal to the friction torque of the steering angle change mechanism, wherein
the pre-control unit acquires a vehicle speed of the car, and determines the pre-control amount that is represented by the pre-control signal that is output at the deflection starting position on the basis of the vehicle speed acquired and a preset relation indicating that the friction torque increases as the vehicle speed decreases, and wherein
the pre-control unit is configured to:
calculate a pre-control time that is a period of time during which the pre-control signal is output using a lateral velocity of the car and a pre-control distance set in advance as a distance in a lane width direction in which the pre-control signal are output; and
output, during the pre-control time, the pre-control signal representing the pre-control amount that increases the assist torque at a constant gradient determined using the pre-control time and the assist torque that is generated by the motor at the deflection starting position.

4. A lane departure suppression device provided in a car equipped with a steering angle change mechanism that changes a steering angle and with a motor that operates the steering angle change mechanism, the lane departure suppression device comprising:
a main control unit that outputs a main control signal after a position of the car reaches a deflection starting position at which deflection of the car is started in order to suppress departure of the car from a lane, the main control signal representing a main control amount for causing the motor to generate an assist torque that changes the steering angle; and
a pre-control unit that outputs, until the main control unit outputs the main control signal, a pre-control signal while the position of the car is located closer to a center of the lane than the deflection starting position is, the pre-control signal representing a pre-control amount for causing the motor to generate the assist torque equal to or less than a friction torque of the steering angle change mechanism, and outputs, at the deflection starting position, the pre-control signal representing the pre-control amount for making the assist torque equal to the friction torque of the steering angle change mechanism; wherein
the pre-control unit is configured to:
calculate a pre-control time that is a period of time during which the pre-control signal is output using a lateral velocity of the car and a pre-control distance set in advance as a distance in a lane width direction in which the pre-control signal are output; and
output, during the pre-control time, the pre-control signal representing the pre-control amount that increases the assist torque at a constant gradient determined using the pre-control time and the assist torque that is generated by the motor at the deflection starting position.

5. The lane departure suppression device according to claim 4, wherein
the pre-control unit acquires a vehicle speed of the car, and determines the pre-control amount that is represented by the pre-control signal that is output at the deflection starting position on the basis of the vehicle speed acquired and a preset relation indicating that the friction torque increases as the vehicle speed decreases.

* * * * *